United States Patent
Appleyard

(10) Patent No.: US 9,902,419 B2
(45) Date of Patent: Feb. 27, 2018

(54) TELESCOPIC STEERING COLUMN ASSEMBLY

(71) Applicant: TRW Limited, West Midlands (GB)

(72) Inventor: Michael Appleyard, Gloucestershire (GB)

(73) Assignee: TRW LIMITED, Solihull, West Midlands (GB)

( * ) Notice: Subject to any disclaimer, the term of this patent is extended or adjusted under 35 U.S.C. 154(b) by 0 days.

(21) Appl. No.: 15/322,518

(22) PCT Filed: Jun. 30, 2015

(86) PCT No.: PCT/GB2015/051911
§ 371 (c)(1),
(2) Date: Dec. 28, 2016

(87) PCT Pub. No.: WO2016/001655
PCT Pub. Date: Jan. 7, 2016

(65) Prior Publication Data
US 2017/0158220 A1 Jun. 8, 2017

(30) Foreign Application Priority Data

Jun. 30, 2014 (GB) .................................. 1411629.7

(51) Int. Cl.
*B62D 1/185* (2006.01)
*F16C 23/06* (2006.01)
(Continued)

(52) U.S. Cl.
CPC .............. *B62D 1/185* (2013.01); *F16C 19/06* (2013.01); *F16C 19/16* (2013.01); *F16C 23/06* (2013.01);
(Continued)

(58) Field of Classification Search
CPC ..... B62D 1/185; B62D 1/187; F16C 2326/24; F16C 19/06; F16C 19/10; F16C 19/16;
(Continued)

(56) References Cited

U.S. PATENT DOCUMENTS 6,343,993 B1 * 2/2002 Duval ...................... B62D 1/16
384/49
6,942,386 B2 * 9/2005 Weissflog .............. B62D 1/185
384/47

(Continued)

FOREIGN PATENT DOCUMENTS

CN 202294944 U 7/2012
DE 10130908 A1 1/2003
(Continued)

OTHER PUBLICATIONS

Patents Act 1977: Search Report under Section 17(5), Application No. GB1411629.7, dated Dec. 15, 2014.
(Continued)

*Primary Examiner* — Laura Freedman
(74) *Attorney, Agent, or Firm* — MacMillan, Sobanski & Todd, LLC

(57) ABSTRACT

A telescopic steering column assembly comprises an upper and a lower shroud portion able to move relatively during telescopic adjustment, a telescopic steering shaft that passes through and is supported by the shroud portions through at least one support bearing assembly that acts between an upper portion of the telescopic steering shaft and a lower portion of the shroud that move relative to one another axially during telescopic adjustment. The at least one support bearing assembly comprises a first bearing race which is separate from the shroud portions and the steering shaft, a resilient spacer that applies a biasing force that is directed in a radial direction from the axis of the shaft and that is located between the first race and an adjacent face of one of
(Continued)

the lower shroud portion and the upper shaft portion; a set of bearings, and a cage that locates the bearings relative to the first bearing race. The bearings bear onto a second bearing race that is defined by a surface of the other one of the lower shroud portion and the upper shaft portion, the second bearing face permitting the bearings to slide or roll in the direction of adjustment of the steering column assembly when it is adjusted for reach.

12 Claims, 3 Drawing Sheets

(51) Int. Cl.
*F16C 23/08* (2006.01)
*F16C 19/06* (2006.01)
*F16C 19/16* (2006.01)
*F16C 31/04* (2006.01)
*F16C 27/04* (2006.01)
*F16C 33/60* (2006.01)

(52) U.S. Cl.
CPC .............. *F16C 23/08* (2013.01); *F16C 27/04* (2013.01); *F16C 31/04* (2013.01); *F16C 33/60* (2013.01); *F16C 2326/24* (2013.01)

(58) Field of Classification Search
CPC .......... F16C 27/04; F16C 23/06; F16C 23/08; F16C 31/04; F16C 31/06; F16C 33/60
See application file for complete search history.

(56) References Cited

U.S. PATENT DOCUMENTS

| | | | |
|---|---|---|---|
| 6,942,417 B2* | 9/2005 | Schwarzbich | B62D 1/185 403/109.1 |
| 8,960,045 B2* | 2/2015 | Ishige | B62D 1/192 280/775 |
| 9,145,160 B2 | 9/2015 | Domig et al. | |
| 9,566,996 B2* | 2/2017 | Wilkes | B62D 1/192 |
| 2003/0227162 A1 | 12/2003 | Ulintz | |
| 2007/0126222 A1 | 6/2007 | Koya et al. | |
| 2011/0241327 A1* | 10/2011 | Montboeuf | B62D 1/16 280/775 |
| 2014/0150597 A1 | 6/2014 | Buzzard et al. | |
| 2015/0003770 A1* | 1/2015 | Bussit | B23P 15/003 384/569 |
| 2017/0261028 A1* | 9/2017 | Wilkes | F16C 3/035 |

FOREIGN PATENT DOCUMENTS

| | | | | |
|---|---|---|---|---|
| EP | 0425238 A1 | | 5/1991 | |
| EP | 1167790 A1 | * | 1/2002 | ............ B62D 1/185 |
| FR | 2838093 A1 | | 10/2003 | |
| GB | 2459959 A | | 11/2009 | |
| JP | 2004211774 A | * | 7/2004 | ............ F16C 27/066 |
| JP | 2006300200 A | * | 11/2006 | ............ F16C 23/084 |
| JP | 2007118896 A | | 5/2007 | |
| WO | 2013185868 A1 | | 12/2013 | |

OTHER PUBLICATIONS

PCT International Search Report and Written Opinion, Application No. PCT/GB2015/051911, dated Oct. 2, 2015.

* cited by examiner

TELESCOPIC STEERING COLUMN ASSEMBLY

CROSS-REFERENCE TO RELATED APPLICATIONS

This application is a national stage of International Application No. PCT/GB2015/051911, filed 30 Jun. 2015, the disclosures of which are incorporated herein by reference in entirety, and which claimed priority to Great Britain Patent Application No. 1411629.7 filed 30 Jun. 2014, the disclosures of which are incorporated herein by reference in entirety.

BACKGROUND OF THE INVENTION

This invention relates to an improved steering column assembly.

There are many applications in which it is desirable for a steering column apparatus to be telescopic so that the length of the steering column can be adjusted. By allowing part of the shaft or shroud to move telescopically over another, the steering assembly can be adjusted for reach. In a crash, where a driver impacts the steering wheel, this can also allow the wheel to move and by controlling the rate at which the telescopic movement occurs, it is possible to absorb the energy in the crash in a controlled manner.

In a typical arrangement the steering column includes a telescopic shroud having an upper and a lower tubular shroud portion. There is a slit in the top surface of the upper tube which extends along a large portion (usually more than half) of its length and which enables the upper tubular portion to be squeezed into firm contact with the lower tubular portion by means of a driver-operated clamping mechanism which is assembled around a so-called adjustment clamp bolt. The clamp bolt is typically able to slide in a generally vertical direction in slots in a vehicle mounted so-called Rake Bracket in order to make the steering wheel adjustable for height. The steering wheel actually adjusts in an arc centred around a Pivot Axis which is usually designed as part of the lower mounting means where an optional Electric Power Steering (EPS) unit mounts to the vehicle at the lower end of the overall Column and EPS assembly. The Clamp Bolt also passes through generally horizontal slots in the clamp brackets which form an upper part of the upper tube in order to allow the steering wheel to be adjusted for Reach.

Where in electric power steering unit is incorporated into the column, in a common arrangement the upper tube, by which we mean the one nearest the steering wheel, is the outer tube with the lower tube slidably located within the upper tube. It is conventional to support the upper column shaft by one ball bearing at the upper end of the upper column tube and also lower down via a splined sliding interface with the Input Shaft of the EPS unit. The EPS Input Shaft is cantilevered from two closely spaced bearings within the gearbox of an EPS unit. The resistance to bending of the pair of shafts, i.e. the Upper Column Shaft and the EPS Input Shaft critically depends on the bending stiffness of the said sliding interface which, because it must slide freely to allow the upper column to telescope, must possess some, albeit small, clearances. This method of supporting the Upper Column Shaft, while economical, makes it difficult to achieve the minimum natural vibration frequency target (typically 50 Hz) which vehicle manufacturers usual impose. Historically, this target has been aimed at minimizing steering wheel shake due to engine vibrations or road roughness. More recently, some vehicle manufacturers have been specifying still higher targets to avoid steering wheel shake during the operation of automatic engine stop-start fuel saving strategies.

BRIEF SUMMARY OF THE INVENTION

It is a feature of the present invention to improve the performance of a steering column assembly such as the kind described above.

According to a first aspect, the invention provides a telescopic steering column assembly comprising an upper shroud portion, a lower shroud portion, the two shroud portions being able to move relatively along a common linear path during telescopic adjustment, a telescopic steering shaft that passes through the upper and lower shroud portions and is supported by the shroud portions through at least one support bearing assembly that acts between an upper portion of the telescopic steering shaft and a lower portion of the shroud that move relative to one another axially during telescopic adjustment of the steering assembly for reach, the support bearing assembly in use removing free play between the shaft and the shroud portions that would otherwise occur in at least one direction orthogonal to the telescopic movement, in which the at least one support bearing assembly comprises:

a first bearing race which is separate from the shroud portions and the steering shaft, a resilient spacer that applies a biasing force that is directed in a radial direction from the axis of the shaft and that is located between the first race and an adjacent face of one of the lower shroud portion and the upper shaft portion;

a set of bearings, and a cage that locates the bearings relative to the first bearing race, and characterised in that the bearings bear onto a second bearing race that is defined by a surface of the other one of the lower shroud portion and the upper shaft portion, the second bearing face permitting the bearings to slide or roll in the direction of adjustment of the steering column assembly when it is adjusted for reach.

The apparatus of the invention removes radial play whilst allowing the required telescopic movement in a simple manner using a reliable and simple to assemble bearing assembly. The use of the resilient spacer allows the bearing assembly to apply a moderate radial preload to the bearing components to eliminate the clearances. This takes advantage of the fact that the radial disturbance forces which arise within the column at the vibration frequencies of concern are quite small. When larger, quasi-static, radial forces are applied, such as a driver leaning heavily on the rim of the steering wheel, small clearances may be temporarily permitted to arise in certain locations within the bearing but, realistically, these do not lead to unwanted vibrations. By avoiding the use of a large radial preload, the contact forces between the bearing and the bore of the lower tube are kept generally low. Therefore the frictional resistance to the bearing turning and sliding is also kept low.

The resilient spacer may be axially fixed relative to the one of the lower shroud portion and upper shaft portion by frictional engagement of the contacting surfaces or may be mechanically restrained by restraining means that may include one or more of circlips, shoulders and/or washers.

The first bearing race may comprise an inner bearing race that is located radially inside the bearings and cage, which are arranged around a common axis, and the resilient spacer is preferably located between the inner race and the upper shaft portion.

The second bearing race may therefore comprise the inner surface of the lower shroud portion. This may have a constant diameter over a length of the inner surface at least equal to the amount of telescopic movement during adjustment of the assembly for reach. This ensures the bearings can roll or slide easily and that a uniform load is applied to the bearings for all reach positions.

The resilient spacer, which may function as a biasing means applying a preload to the bearings may comprise an annular ring. It may be a continuous ring with no discontinuities.

The resilient spacer may act directly on the first bearing race, and as such may be located on the opposite side of the first bearing race to the bearings.

The annular ring may, in a simple arrangement, comprise a ring of compressible material of uniform thickness in the radial direction when unloaded that is slightly greater than the average spacing between the inner surface of the bearing race and the outer surface of the upper shaft portion so that in use the ring may be lightly compressed, so that a radial load is applied evenly around the inner race.

The resilient spacer may alternatively comprise an interlinked set of circumferentially extending arcuate portions that together form a ring including at least three circumferentially extending arcuate portions that are spaced apart from each other around the axis of the ring and that provide the majority or all of the compressive preload between the first bearing race and the one of the lower shroud portion and the upper shaft portion. By this we mean that the interconnecting portions apply little or no preload to the bearings in normal use, and will typically only lightly touch the bearing race of not touch it all.

The ring may be a closed ring with no ends.

The three pre-load bearing arcuate portions may each be thicker as measured in a radial direction than the portions that interconnect them so that in use the portions that interconnect them apply substantially no preload to the bearing race. For instance, the interconnecting portions may be of a reduced radial thickness compared with the three portions.

The three portions may be spaced substantially evenly around the ring, so that there is a spacing of approximately or precisely 120 degrees between the centres of adjacent portions.

At least two of the three portions that carry the majority of the preload may comprise relatively rigid, incompressible, portions. For instance, they may comprise curved metal pads, or any other relatively incompressible pad. In a most preferred arrangement there are only two of these portions out of the at least three portions, spaced apart around the circumference of the resilient spacer.

The third of the portions may comprise one or more radially extending resiliently compressible elements that are supported by an arcuate portion so that the compressible elements and supporting portion together have a radial thickness at rest that is greater than the average spacing between the first race and the one of the upper shaft and lower shroud portion.

This third portion may comprise a resiliently compressible or otherwise resiliently deformable portion, such as a rubber or plastic element. It may include a set of radially extending ridges, or spines, or other radially extending protrusions, that may either compress or deflect so as to produce a force that ensures the two relatively incompressible portions are always in contact with and applying a preload to the bearings.

The third portion may be integrally formed with the arcuate portions that interconnect the other two load bearing portions.

There may be more than one of these third portions, each spaced from the other. Where there are more than two, then it is preferred that they are all located in series between the two relatively incompressible portions.

In one arrangement the resilient spacer comprises an endless ring that forms the third portion and connecting portions, with the two or more other preload bearing portions being located within pockets formed in the ring that define the other two load bearing portions.

The bearings may comprise ball bearings or roller bearings, or a mixture of ball and roller bearings. They may be located in the cage so that they are equally circumferentially spaced around the bearing assembly, providing a uniform distribution of the loads.

The first bearing race may comprise a ring with a slit that extends from one side to the other so that the ring is not continuous but has two adjacent ends, the ends being spaced apart slightly to enable the diameter of the race to vary as the preload is applied by the resilient spacer.

The bearing race may comprise a metal strip.

The ends may be mitred so that a smooth bearing surface is created around which the bearings can roll or slide as the steering wheel, and hence steering shaft, rotates.

Other advantages of this invention will become apparent to those skilled in the art from the following detailed description of the preferred embodiments, when read in light of the accompanying drawings.

DETAILED DESCRIPTION OF THE INVENTION

Figure 1:
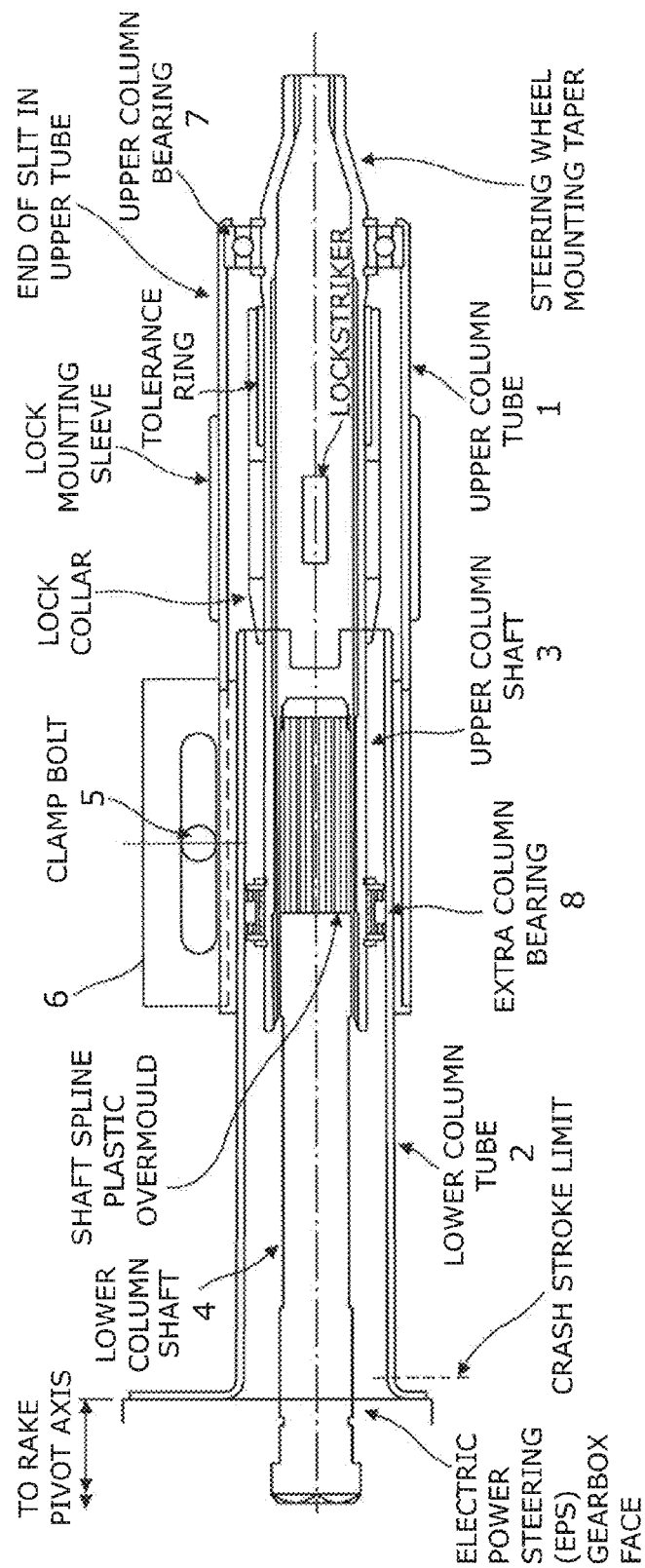
FIG. 1 is a vertical cross sectional view of a part of an embodiment of a steering column assembly of the present invention.

FIG. 1 provides a view of a steering column assembly which includes a telescopic arrangement within the scope of one aspect on the present invention. The steering column assembly comprises a shroud 1, 2 which comprises a tubular upper shroud portion 1 and a tubular lower shroud portion 2, each of which comprises a cylindrical tube. The shroud portions 1, 2 are moveable relative to each other with the end of the upper shroud portion 1 being a sliding fit within an end of the lower shroud portion 2. The shroud 1, 2 surrounds a telescopic steering column shaft 3, 4. The shaft comprises an upper shaft portion 3 that at least partially surrounds a lower shaft portion 4, the two portions being connected through complimentary axially extending splines. The opposite end of the upper shaft is tapered so that it can be secured to a steering wheel (not shown). The lower shaft portion 4 is connected to an optional electric power steering gearbox which in turn connects to the road wheels of the vehicle The upper shaft fits over the lower shaft and the upper shaft portion 3 moves whilst the lower shaft portion 4 does not move axially. Similarly, the upper, outer, shroud portion 1 is located towards the steering wheel and slides over the lower, inner, shroud portion 2. The lower shroud portion 2 is axially fixed to a gearbox (not shown). The tubular upper shroud portion 1 may be secured to a fixed part of the vehicle using a clamp mechanism (of which only a clamp bolt 5 is shown) that clamps onto a rail 6 on the upper shroud portion 1. A slit is provided in the outer shroud that is closed up as the clamp assembly is closed to cause the outer shroud portion 1 to grip the inner shroud portion 2.

An upper column bearing assembly 7 is located between the upper shaft 3 and the inner surface of the upper shroud portion 1. This snugly fills the space and ensures that the shaft 3 is located securely within the shroud 1.

An extra column bearing assembly 8 is provided between the inner shroud portion and the upper shaft 3, in the region where they overlap, providing support for the shaft 3, 4 close to the joint between the two shaft portions. In use the extra support bearing assembly 8 removes the free play that would other exist and this increases the minimum resonant natural frequency of the whole assembly compared with the same assembly without the support bearing assembly 8. This can provide a welcome improvement in the levels of NVH (noise, vibration and harshness) perceived by a user when the vehicle is travelling along a rough surface. The outer shroud portion 2, support bearing assembly 7 and shaft 3, 4 together form a telescopic assembly within the scope of the first aspect of the invention.

To allow the length of the shroud to be adjusted, the inner shroud must be free to move axially relative to the outer shroud. To this end, the support bearing assembly 8 is fixed axially only to the outer surface of the shaft 3 and is able to slide axially relative to the inner surface of the lower shroud portion 2.

Figure 2:
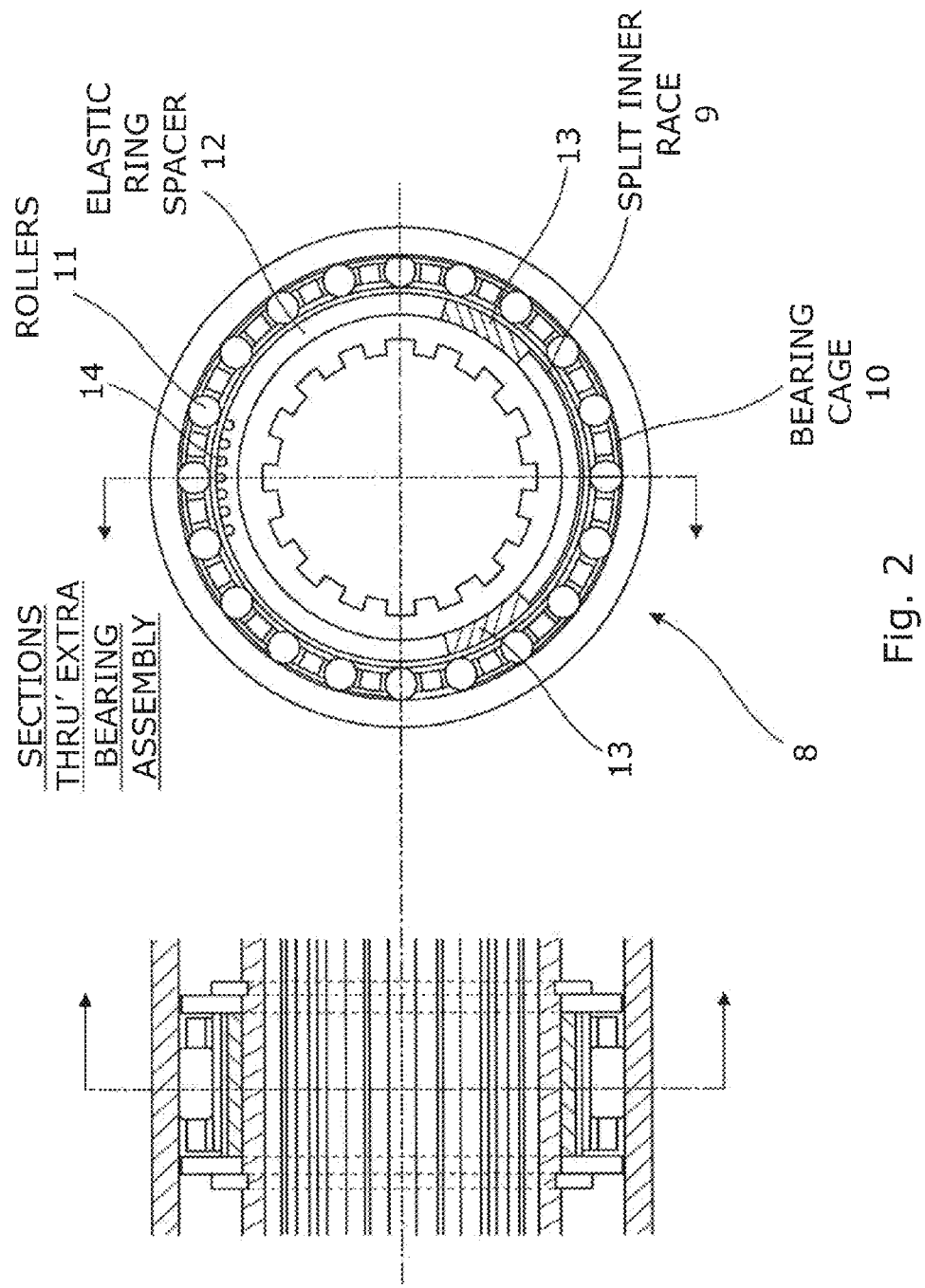
FIG. 2 is a first angle projection view of the bearing assembly that sits between the inner and outer shrouds along with a view of the adjacent part of the shrouds.
Figure 3:
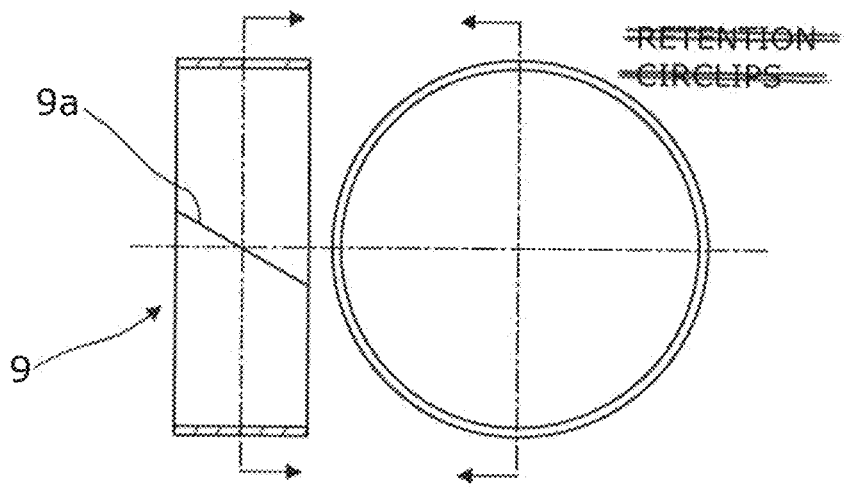
FIG. 3 is a view in the first angle projection of the split inner bearing race.
Figure 4:
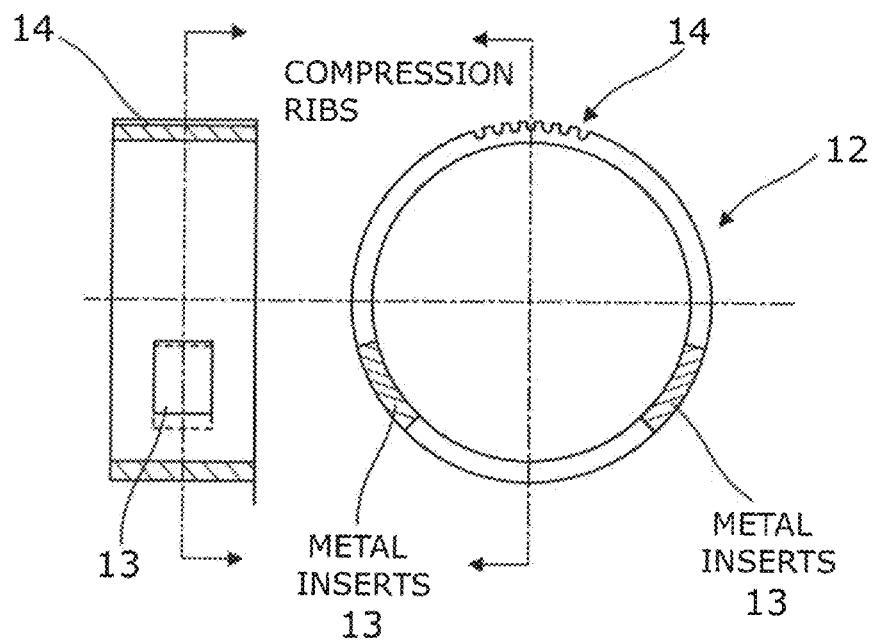
FIG. 4 is a view in the first angle projection of an exemplary resilient spacer assembly that secures the inner race to the inner shroud portion.

The support bearing assembly 8 is shown in more detail in FIG. 2 and parts of the bearing assembly 8 are shown separately in FIGS. 3 and 4 of the drawings.

The extra bearing assembly 8 comprises an inner bearing race 9 through which the shaft 3 passes. A set of roller bearings 11 run in a track formed in an outwardly facing surface of the inner race and are held in position by a bearing cage 10. There is no discrete outer bearing race and instead the roller bearings roll on the inner surface of the inner shroud potion 2. The roller bearings are free to slide axially along this surface as required, with the surface being given a smooth finish to reduce friction during this sliding motion.

The inner race 9 of the bearing assembly comprises a strip of steel which is formed into a ring and whose ends are mitred 9a so that they come together to form a narrow split line which was angled relative to the bearing axis. This enables the inner race to expand or contract slightly while allowing the rollers to still progress around it noiselessly. The bore of the Lower shroud portion is smooth and accurate within conventional manufacturing tolerances. Because the radial forces acting on this bearing are generally small in relation to its overall size, there is no need to specially harden the surface of the said bore. This bore therefore acts as the bearing's outer race, proving suitable for both rolling contact and axial sliding contact of the rollers without damage.

The inner race 9 is fixed to the outer surface of the upper shaft portion 1 by a resilient spacer 12. The spacer could be a simple elastic ring which has an inner diameter, in a relaxed state before assembly that is slightly less than the outer diameter of the corresponding section of the upper shaft 1, and also an outer diameter when relaxed that is slightly greater than the inner diameter of the inner race. Thus when in the assembled position this ring presses the inner race away from the shaft 1 and thereby presses the rollers into contact with the inner shroud portion 2.

However, in this embodiment the resilient spacer comprises a ring structure that includes a number of discrete, yet interconnected, arcuate portions that have differing properties. The function of the different portions it to provide a controlled preload of the inner race at a reduced number of locations, giving a higher degree of performance in managing preload and also abuse loads applied to the steering shaft, for instance when a driver pulls heavily down on the steering wheel.

The resilient spacer 12 is shown in FIG. 4. It includes three arcuate portions 13, 14 that are equally spaced apart from each other around the axis of the ring and that provide the path across which in normal use all of the compressive preload between the first bearing race and the upper shaft portion passes.

The three arcuate portions 13, 14 are each radially wider than portions that interconnect them so that in use the portions that interconnect them apply substantially no preload to the bearing race. As shown in FIG. 2 a small gap is present between the outer face of these interconnecting portions and the inner race, so their sole function in this example is to locate the three load bearing portions relative to one another.

Two portions 13 of the three portions that carry the majority of the preload comprise relatively rigid, incompressible, metal pads. Of course other materials could be used.

The third of the portion 14 comprises a compressible rubber or elastomeric pad that has a radial thickness at rest that is greater than the average spacing between the first race and the one of the upper shaft and lower shroud portion. This third portion 14 includes a set of radially extending ridges, or spines, on the surface that engages the inner race that both resiliently compress and deflect so as to produce a force that ensures the two relatively incompressible portions are always in contact with and applying a preload to the bearings. The radial ridges extend around the circumference of the third portion.

In this example the third portion is integrally formed with the interconnecting portions that connect the two metal pads together.

By choosing the total of the radial thickness of the ribbed third portion, the inner race, and the roller bearings to be slightly greater than the radius of the bore of the Lower shroud portion the ribs of the rubber ring are put into compression when the bearing is assembled to the column. This compression provides a radial preload.

In this example there are two solid arcuate inserts 13 located in the rubber ring whose centres are approximately 120 degrees apart. The wall thickness of the rubber ring is reduced for most of its circumference so as to ensure that only the said solid inserts provide the radial support between the shaft and the inner race, rather than the rubber. The ribs of the third portion preload the shaft into contact with the two solid inserts and, in turn, onto the inside surface of the inner race. The Inner race, in trying to expand as a result of this, exerts a radial preload on the rollers which are in the vicinity of the inserts. Likewise, the inner race is urged against the rollers which are in the vicinity of the compression ribs. It now requires a considerable radial force acting on the shaft in a direction towards the arc of ribs to further compress them are cause the shaft to lose contact with the two solid inserts. Such a magnitude of radial force is well in excess of that which would be encountered in a steering wheel natural frequency test or in circumstances which are likely to excite the natural vibration modes of the steering wheel. For small radial disturbances in any direction, the shaft behaves as though it is rigidly connected to the shroud.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A telescopic steering column assembly comprising an upper shroud portion, a lower shroud portion, the two shroud portions being able to move relatively along a common linear path during telescopic adjustment, a telescopic steering shaft that passes through the upper and lower shroud portions and is supported by the shroud portions through at least one support bearing assembly that acts between an upper portion of the telescopic steering shaft and the lower shroud portion that move relative to one another axially during telescopic adjustment of the steering column assembly for reach, the support bearing assembly in use removing free play between the telescopic steering shaft and the shroud portions that would otherwise occur in at least one direction orthogonal to the telescopic adjustment, in which the at least one support bearing assembly comprises:
a first bearing race which is separate from the shroud portions and the steering shaft,
a resilient spacer that applies a biasing force that is directed in a radial direction from an axis of the steering shaft and that is located between the first bearing race and an adjacent face of one of the lower shroud portion and the upper shaft portion;
a set of bearings, and
a cage that locates the bearings relative to the first bearing race,
wherein the bearings bear onto a second bearing race that is defined by a surface of the other one of the lower shroud portion and the upper shaft portion, the second bearing race permitting the bearings to slide or roll in the direction of telescopic adjustment of the steering column assembly when adjusted for reach.

2. The telescopic steering column assembly according to claim 1 in which the resilient spacer is axially fixed relative to the one of the lower shroud portion and upper shaft portion by frictional engagement of the contacting surfaces.

3. The telescopic steering column assembly according to claim 1 in which the first bearing race comprises an inner bearing race that is located radially inside the bearings and cage, which are arranged around a common axis, and the resilient spacer is located between the inner race and the upper shaft portion.

4. The telescopic steering column assembly according to claim 1 in which the second bearing race comprises an inner surface of the lower shroud portion.

5. The telescopic steering column assembly according to claim 1 in which the resilient spacer comprises an annular ring.

6. The telescopic steering column assembly according to claim 5 in which the annular ring comprises an interlinked set of circumferentially extending arcuate portions that together form a ring including at least three circumferentially extending arcuate portions that are spaced apart from each other around an axis of the ring and that provide a majority or all of a compressive preload between the first bearing race and the one of the lower shroud portion and the upper shaft portion.

7. The telescopic steering column assembly according to claim 6 in which the three arcuate portions are each thicker as measured in a radial direction than the portions that interconnect them so that in use the portions that interconnect them apply substantially no preload to the first bearing race.

8. The telescopic steering column assembly according to claim 6 in which the three arcuate portions are spaced substantially evenly around the ring, so that there is a spacing of approximately or precisely 120 degrees between the centres of adjacent portions.

9. The telescopic steering column assembly according to claim 6 in which at least two of the three arcuate portions that carry the majority of the preload comprise relatively rigid, incompressible, portions.

10. The telescopic steering column assembly according to claim 9 in which a third of the three arcuate portions comprises one or more radially extending resiliently compressible elements that are supported by an arcuate portion so that the compressible elements and supporting portion together have a radial thickness at rest that is greater than the average spacing between the first bearing race and the one of the upper shaft and lower shroud portions.

11. The telescopic steering column assembly according to claim 10 in which the third of the three arcuate portions is integrally formed with the arcuate portions that interconnect the other two arcuate portions.

12. The telescopic steering column assembly according to claim 1 in which the first bearing race comprises a ring with a slit that extends from one side to the other so that the ring is not continuous but has two adjacent ends, the ends being spaced apart slightly to enable the diameter of the first bearing race to vary as the force is applied by the resilient spacer.

* * * * *